US005623277A

United States Patent [19]

Lippmann et al.

[11] Patent Number: 5,623,277

[45] Date of Patent: Apr. 22, 1997

[54] LIQUID CRYSTAL DISPLAY WITH IMAGE STORAGE ROM

[75] Inventors: Raymond Lippmann, Ann Arbor; Michael J. Schnars, Clarkston; James E. Nelson, North Branch; Mark J. Miller, Grand Blanc, all of Mich.

[73] Assignee: Delco Electronics Corporation, Kokomo, Ind.

[21] Appl. No.: 593,029

[22] Filed: Jan. 29, 1996

[51] Int. Cl.[6] .............................. G06F 12/00; G12B 9/10

[52] U.S. Cl. .............................................. 345/87; 345/189

[58] Field of Search ................................ 345/87, 90, 89, 345/55

[56] References Cited

U.S. PATENT DOCUMENTS

| | | | |
|---|---|---|---|
| 4,162,610 | 7/1979 | Levine | 345/189 X |
| 4,754,271 | 6/1988 | Edwards | 345/87 |
| 5,465,102 | 11/1995 | Usui et al. | 345/89 |

*Primary Examiner*—Mark R. Powell
*Attorney, Agent, or Firm*—Jimmy L. Funke

[57] ABSTRACT

An IC driver mounted on a LCD display package contains a sensor for determining temperature of the LCD cell, and a digital value of the temperature is serially transmitted to a remote microprocessor which determines compensated voltage and sends voltage command data back to the IC driver which produces a drive voltage by a charge pump. A digital code on the LCD cell identifies cell response characteristics and the code is used by the microprocessor to calculate the desired voltage. A ROM in the IC driver stores many bit-mapped images which are selected by the microprocessor for display.

6 Claims, 4 Drawing Sheets

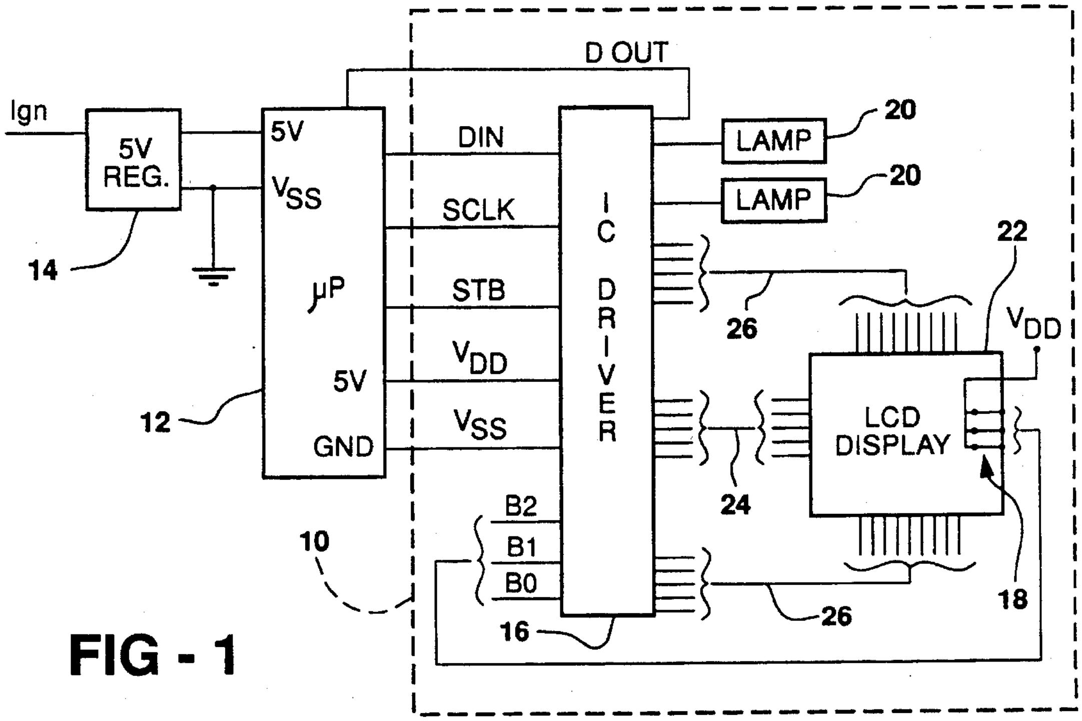
FIG - 1
FIG - 2
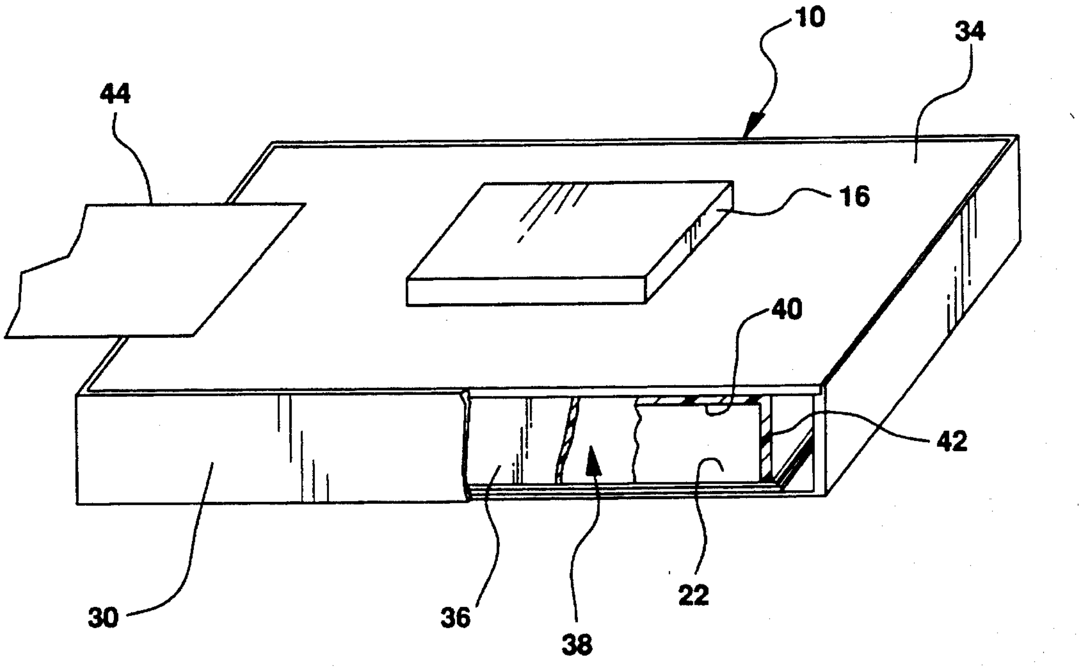

LIQUID CRYSTAL DISPLAY WITH IMAGE STORAGE ROM

FIELD OF THE INVENTION

This invention relates to a liquid crystal display (LCD) and particularly to such a display having a ROM containing bit-mapped graphic images integrated with the display.

BACKGROUND OF THE INVENTION

Automotive instrument clusters have limited room for displaying messages. With the advent of serial communication links in vehicles and more complex systems which must be monitored, the number of tell-tale warnings which accompany these systems has greatly increased to the point that there is insufficient available area for them. It has been proposed to use a small reconfigurable display which displays one message at a time. If more than one message is called for, a microprocessor will sequence the messages in time. Such a display is subject to a number of constraints. The area taken up in the cluster must be minimal and is not to be substantially larger than a single display area itself. It must operate over a wide temperature range, at least −40° C. to +95° C. Further the display must by as inexpensive as possible so that it is competitive. It is desirable that the message area be dead fronted when messages are not displayed.

It is desirable that a LCD be used for the display. Such displays require a driver which typically is an integrated circuit (IC). Most commercial LCD driving ICs are poorly suited for the application and tend to be over designed in some areas and under designed in others. For example, the LCD display for this application needs a display format of 14 pixels high by 90 pixels wide or 1260 pixels. Commercial LCD driving ICs are tuned for general applications and typically require two or more ICs to obtain the necessary pixel count. Commercial driver ICs use general output drivers which are much larger and more expensive than required for this application.

A small display can accommodate only a limited number of connections between the IC driver and the LCD. To handle the 1260 pixels with a few connections it is necessary to use a high rate of multiplexing. As multiplex rates increase the voltages used to operate the cell have to be controlled more precisely and have to be compensated over the temperature range. Due to the wide temperature range the maximum voltage varies greatly, say, from 5 to 11 volts. To assure correct voltage for every point in the range the temperature of the LCD cell has to be closely monitored, within a degree or so. The optimum voltage is also dependent on the liquid crystal material in the cell, and the LCD characteristics can vary from cell to cell or from batch to batch. The voltage must also be compensated for that variation.

In general purpose ICs, the number of messages which are to be displayed is not generally limited, so that such parts are designed to have each pixel state (1260 in this case) loaded into them by a microprocessor. However, downloading that much data by a microprocessor which is busy with other tasks comprises a severe software burden. In a tell-tale display there is a limited number of messages which must be displayed (typically 30 or less) and so it becomes possible and desirable to use another technique to avoid the downloading task.

It is known to use a character generator in a display package which stores images of individual characters and has a control for calling up a sequence of characters for display. Such a display is limited to characters only and to a particular font, so that the displayed character size cannot vary, limiting the size of the display message. In addition, the control for such a display requires control circuitry including a ROM for generating the message.

SUMMARY OF THE INVENTION

It is therefore an object of the invention to afford a custom IC driver for LCD displays which relieves the microprocessor of image transfer burden. Another object in such an IC driver is to optimize the utilization of silicon substrate space. A further object is to improve flexibility in character font capability in an LCD display.

An IC driver chip is directly mounted on an LCD package such that the driver is at the same temperature as the LCD cell, and is connected to the cell by many conductors of a circuit board to energize rows and columns of the cell. To minimize the number of connections to the cell and thereby minimize the size of the cell, the display is highly multiplexed. The IC driver includes a ROM containing a bit-mapped image of every desired message. A serial peripheral interface in the IC driver couples the driver to a remote microprocessor which selects the message to be displayed.

The size of the IC chip is mandated by the number of input and output connections made at its periphery. The preponderance of these connections are the outputs to the LCD cell. Even where the chip is made long and narrow to minimize the area for a given number of connections, the area of the chip is sufficient to include a ROM for storing a number of graphic images and still have ample room for column and row drivers. Accordingly the ROM is inexpensively located on the IC drive instead of on the microprocessor chip which is crowded with other functions. Moreover, where a microprocessor is already available to manage the display functions, having the ROM on the IC driver avoids redesign of the microprocessor to accommodate the image storage.

To operate over a wide temperature range and at the high multiplex rate a relatively high voltage and temperature compensated voltage is required. A temperature sensor in the driver is periodically sampled and the microprocessor calculates the compensated voltage and outputs a temperature command. A voltage multiplier in the IC driver is controlled by the command to produce the desired voltage. Another factor in calculating the optimum voltage is the nature of the liquid crystal composition which may vary from cell to cell. In manufacture, the cells are tested for response to voltage, sorted into batches, and physically coded according to response characteristics. In use, the code is read by the driver IC and provided via serial communication to the microprocessor which includes that data in the calculation of the compensated voltage.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a system diagram for an LCD according to the invention;

FIG. 2 is an isometric view of an LCD package which incorporates features of the invention;

DESCRIPTION OF THE INVENTION

Figure 3:
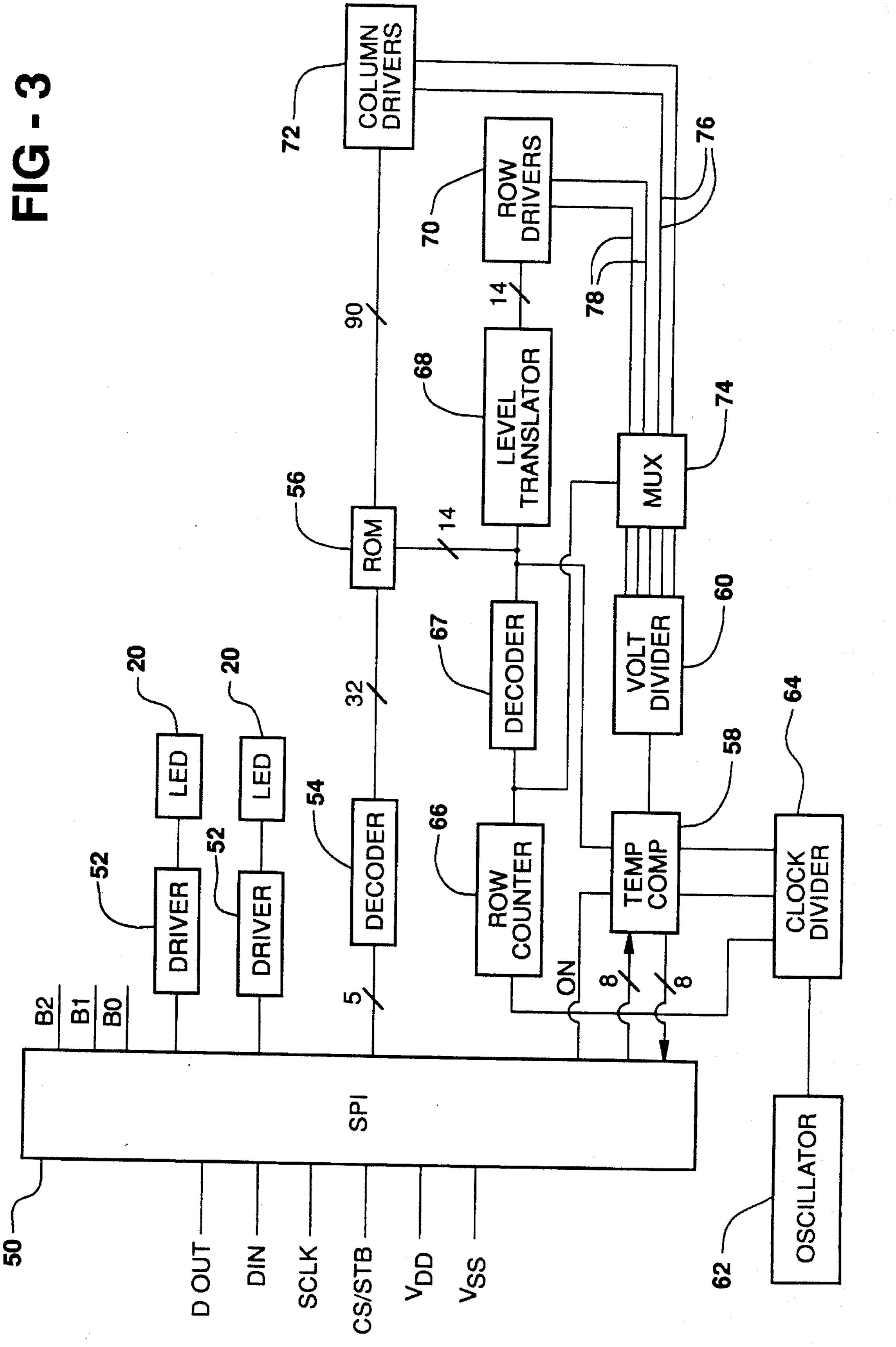
FIG. 3 is a block diagram of the IC driver of FIG. 1.

FIG. 1 shows an LCD package 10 under control of a remotely located microprocessor 12. A 5 volt regulator 14 supplied by vehicle ignition voltage couples 5 volts, ($V_{DD}$) and ground ($V_{SS}$) to the microprocessor. Those voltages in turn are coupled to an IC driver 16 in the LCD package 10. The microprocessor also is connected to the IC driver by lines which supply serial data in (DIN), clock (SCLK) and strobe (STB) signals. Data out (DOUT) signals are coupled from the IC driver to the microprocessor. The voltage $V_{DD}$ supplied by the regulator is subject to lot variations but upon manufacture of the microprocessor system the voltage is calibrated and the variation is kept in the microprocessor EEPROM so that it can correct the voltage which drives the LCD.

Because liquid crystal compositions may vary from batch to batch or a composition may vary due to evaporation of some components during cell manufacture, there is some variation in response of cells to a given voltage. It is useful then to grade the cells, preferably upon manufacture, into categories of response. A permanent code is imposed on each LCD cell to designate its category. In the example of FIG. 1, three links 18 on the LCD cell 22 connect the voltage $V_{DD}$ to ports B0, B1 and B2 of the driver. The links are selectively cut by laser, abrasion, or otherwise to establish a 3 bit code which designates the response category.

Lamps 20 which are preferably LEDs to minimize heating of the LCD cell are turned on and off by signals from the IC driver in response to microprocessor control signals to furnish backlighting of the LCD cell. The LCD cell 22 is energized by 14 conductors 24 from row drivers in the IC 16 and two sets 26 of 45 conductors each from upper and lower column drivers in the IC.

As shown in FIG. 2, the LCD package 10 includes a housing 30, the LCD cell 22, a circuit board 34 spaced from the cell 22, and elastomeric connectors 36 (one on each side) to connect the circuit board conductors 24 and 26 to the cell 22. The conductors emanate from the IC driver chip 16 which is directly attached to the circuit board 34. The driver is connected by wire bonding to the conductors. Two LEDs (not shown) on the circuit board 34 are held in the space between the circuit board and the cell 22 to backlight the cell. A light box 38 comprising a white plastic material has a wall 40 adjacent the circuit board and side walls 42 to efficiently distribute light from the LEDs to the LCD cell. A flexible circuit 44 attached to the circuit board 34 has conductors for connecting the IC driver and the remote microprocessor. The housing is, for example, 1.75 inches long, 1.35 inches wide, and 0.4 inch deep. The display area is 0.625 by 1.2 inches and contains 1260 pixels for a high resolution display image. Due to the chip on board configuration which minimizes thermal mass and the LED lighting which introduces little heat, a temperature sensor in the IC can reliably track the LCD temperature.

The IC driver 16 is shown more fully in FIG. 3. It includes a serial peripheral interface (SPI) 50 having as inputs the DIN, SCLK and STB signals, supply voltage $V_{DD}$, and ground $V_{SS}$, and the output signal DOUT, all carried by the flexible circuit 44. Further, the SPI has inputs for B0, B1 and B2 from the links 18 to introduce the digital LCD code to the serial data passed to the microprocessor controller. Two lamp drivers 52 and associated LEDs 20 are connected to SPI outputs. A decoder 54 is coupled to the SPI and has 32 output lines connected to a select input of a ROM 56. The ROM stores up to 32 bit-mapped images to be displayed, arranged in a 14 row by 90 column format. The decoder 54 selects one of the images to be displayed. A temperature compensation circuit 58 is coupled by an on/off line and 8 line input and output connections to the SPI. The compensator 58 measures the LCD package temperature and sends temperature data to the microprocessor via the SPI, and the microprocessor, in turn, sends a voltage command to the compensator which produces that voltage, $V_{LCD}$. The temperature data sent to the microprocessor is independent of the absolute value of $V_{DD}$, that is, it is ratiometric. A voltage divider 60 produces several equally incremented voltages from the compensator output, i.e. voltages at 100%, 80%, 60%, 40% and 20% of $V_{LCD}$, and ground. An oscillator 62 running at a fixed rate supplies clock pulses via a clock divider 64.

Circuitry for constructing a display image in accordance with a selected ROM image includes a row counter 66 driven by the clock divider 64 and which is coupled to a decoder 67 which sequentially energizes 14 row address lines which connect to the ROM. The row address lines also are fed through a level translator 68 to 14 row drivers 70. The ROM has 90 output lines which connect to 90 column drivers 72. A multiplexer 74, driven by a row counter output and receiving the several voltages from the divider 60, outputs a pattern of voltage waveforms via lines 76 and 78 to the column drivers and the row drivers to effect the desired state of each display pixel. This is achieved by 14 phase multiplexing through energizing one row at a time. This level of multiplexing requires five voltage levels plus ground from the voltage divider 60 and the voltages have to be accurately compensated to suitably operate the display over a wide range of temperatures and as well as for various LCD characteristics.

Figure 4:
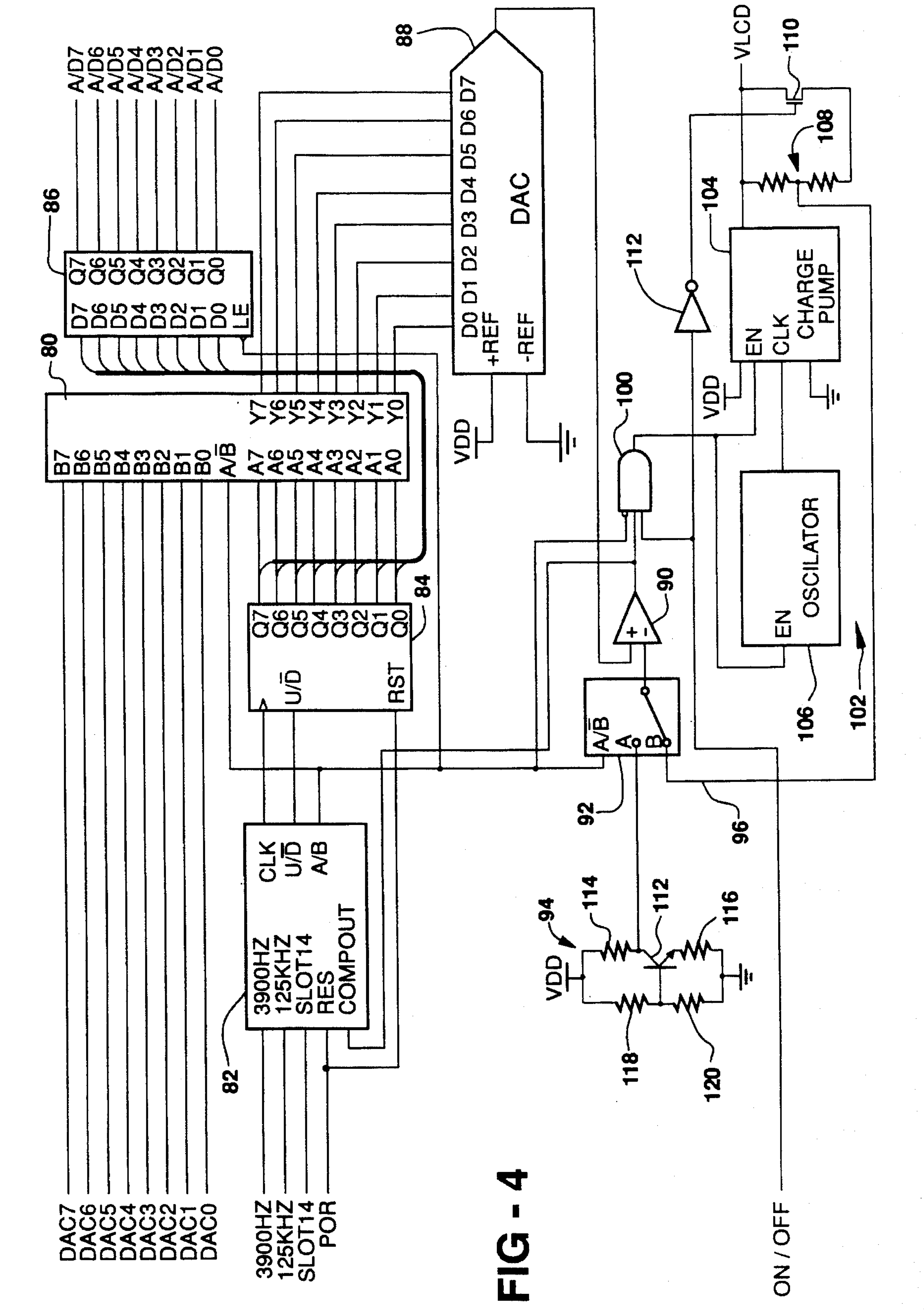
FIG. 4 is a block diagram of the temperature compensation circuit of FIG. 3.

The temperature compensation circuit 58 is shown in FIG. 4. Temperature command input lines DAC0 to DAC7 are 30 coupled to a first set of inputs of a multiplexer 80. Inputs to a control logic circuit 82 are two frequency lines carrying 3.9 kHz and 125 kHz from the clock divider 64, a slot 14 line from the row decoder 67 which identifies when the 14th row is activated, a power on reset for initializing the logic, and a comparator output line. An up/down counter 84 is also coupled to the reset line and has clock input and an up/down control fed from the logic circuit 82 output. The logic circuit also outputs an A/B switch signal to control the multiplexer 80. The counter outputs are connected to multiplexer 80 inputs and to latch 86 inputs. The latch outputs A/D0 to A/D7 comprise the digital temperature output to the microprocessor via the SPI. A latch enable pin LE is connected to the A/B switch line. The multiplexer 80 outputs are connected to a digital to analog converter (DAC) 88. The resulting analog voltage is coupled to the positive input terminal of a comparator 90. The negative input is coupled through a multiplexer 92 to a temperature sensor 94 and to a feedback line 96 of a charge pump 98. The comparator 90 output is fed to an AND gate 100 which also has inputs from the on/off line and the A/B switch line.

A voltage multiplier 102 includes a charge pump 104 excited by an oscillator 106. The gate 100 output is connected to enable inputs of both the oscillator and the charge pump. The output of the charge pump is connected by a voltage divider 108 to ground to produce a tap output on feedback line 96 which equals $5/11*V_{LCD}$. The output $V_{LCD}$ is also connected to ground by a FET 110 which is coupled through an inverter 112 to the on/off line so that an off signal causes the FET to conduct thereby grounding the $V_{LCD}$ output.

In operation of the voltage multiplier, the on/off line is turned on to turn off the FET 110, the B phase of the multiplexers 80 and 92 is selected and the AND gate 100 is enabled to enable the charge pump. The digital voltage command DAC0 to DAC 7 is input to the DAC 88 which generates an analog command voltage on the input of the comparator 90 which, via the AND gate, causes the charge pump to operate to increase the voltage of the $V_{LCD}$ output until the feedback 96 voltage attains the level of the analog command voltage. At that point the $V_{LCD}$ output is equal to 11/5 times the analog command voltage.

The temperature sensor 94 comprises an NPN silicon transistor 112 having its collector connected through a resistor 114 to $V_{DD}$ and its emitter connected through a resistor 116 to ground. The base is connected via divider resistors 118 and 120 to $V_{DD}$ and ground respectively; the base voltage of the transistor is fixed by the voltage divider 118, 120. The base voltage serves to offset the sensor voltage vs. temperature characteristic. The resistors 114 and 116 determine the gain of the circuit. In this manner the $V_{BE}$ drop is amplified and offset. For any given current the temperature coefficient of $V_{BE}$ is a very linear function of temperature. As temperature increases, the sensor $V_{BE}$ drop becomes smaller, thus increasing the voltage on the emitter resistor, decreasing the collector voltage. On the other hand, as temperature decreases, the collector voltage increases.

In operation of the temperature sensor 94, the logic circuit briefly switches the A/B signal to the A phase in the middle of the slot 14 (when row 14 is selected for display). Then the up/down counter 84 is connected by the multiplexer 80 to the DAC 88 to impose a voltage on the comparator 90, and the transistor 112 collector is connected by the multiplexer 92 to the comparator. The DAC and the comparator are then used to implement an analog to digital converter. The comparator output is coupled to the control logic to cause the counter 84 to increment or decrement to change the DAC output to match the temperature sensor output, so that the counter value is the updated temperature data. When the A/B signal again changes state, the latch 86 loads the counter contents, and the DAC and comparator are returned to the task of servicing the charge pump. The temperature data is serially fed to the microprocessor which calculates the desired voltage and serially transmits a voltage command to the temperature compensation circuit in the IC driver.

Figure 5:
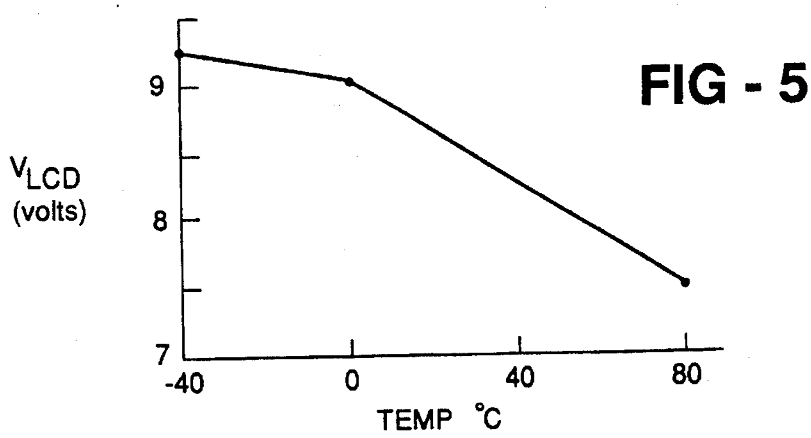
FIG. 5 is a voltage/temperature curve showing an LCD characteristic.

Compensation calculation for temperature and for the LCD characteristics are carried out together in the microprocessor. A calibration is required for each. FIG. 5 is a voltage/temperature curve illustrating the variation of operation voltage for a typical LCD cell. During cell manufacture the cells may have a substantial range of characteristics; they are sorted into perhaps eight groups of similar voltage curves and the curve for each group is specified. Each cell is coded according to its group by selectively cutting the links 18 so that the IC driver can read the group code. For each group, the voltage/temperature curve is embodied in a look-up table in the microprocessor.

Figure 6:
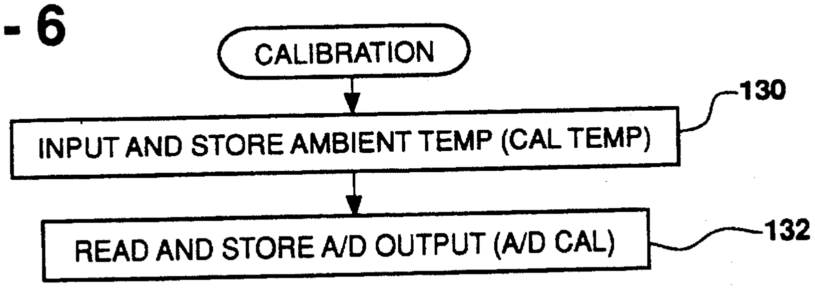
FIGS. 6 and 7 are flow charts illustrating the method of calibration and compensation, respectively.
Figure 7:
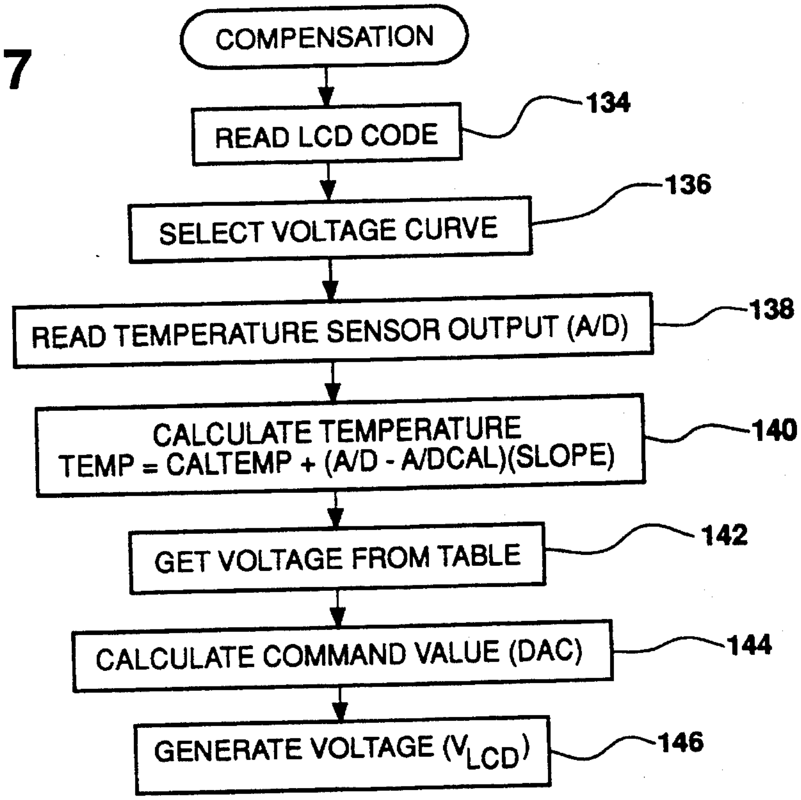

The calibration of the temperature compensation and the compensation method are depicted in flow charts of FIGS. 6 and 7 wherein the functional description of each block in the chart is accompanied by a number in angle brackets <nn> which corresponds to the reference number of the block. The calibration procedure is shown in FIG. 6. To calibrate for temperature the ambient temperature (CALTEMP) is input to the microprocessor and stored in non-volatile memory <130>. At the same time, the digitized output of the temperature sensor is stored in the same way <132>. The slope of the temperature sensor is a constant stored in the microprocessor program. Thus the calibration at the single temperature is sufficient to establish the offset.

The compensation method shown in FIG. 7 requires reading the LCD code <134> and selecting the look-up table for the voltage curve corresponding to that code <136>. The sensor output A/D is read <138> and the temperature is calculated by the microprocessor <140>; the temperature is expressed by the equation TEMP=CALTEMP+(A/D−A/DCAL)(SLOPE). The SLOPE is $V_{DD}/255*SS$ where SS is sensor slope which may be about 20 mv/°C. That gain value SS is predetermined and the initial value of $V_{DD}$ is measured upon manufacture and both are stored in the non-volatile memory. The value of SLOPE then is a constant. Accordingly TEMP varies linearly with the difference between the sensor output and its calibration value to produce an offset in the temperature. TEMP is used to address the look-up table to find the required operating voltage $V_{LCD}$ <142>. Next a voltage command value is calculated <144> such that the voltage multiplier will produce the right voltage. The digital command is $DAC=(V_{LCD}/V_{DD})*255*(5/11)$. When this value is operated upon by the DAC 88 and the voltage multiplier 102 the desired value of $V_{LCD}$ will be produced <146>.

It will thus be seen that the custom IC driver is effective to monitor the temperature of the LCD cell without significantly contributing heat to the cell, and is able to read the LCD code as well. These data are used by the remote microprocessor to determine a voltage command, and a voltage multiplier on the IC chip responds to the command to produce the LCD operating voltage. The net result is that the voltage is accurately controlled over a wide temperature range for a variety of LCD response characteristics so that suitable voltages are available to support a high multiplex rate. In addition the ROM in the IC driver stores all the display images to thereby relieve the microprocessor of the image transmission burden.

The ROM is inexpensively added to the driver since the size of the driver chip is determined by the number of I/O connections, and an IC drive chip for a 14 by 90 pixel display has room for a large ROM. This avoids adding expensive silicon area to the microprocessor to achieve the same purpose. Each of the graphic images stored in the ROM comprises the complete display image data. Such graphic images can include characters of various sizes and styles as well as pictorial symbols.

The embodiments of the invention in which an exclusive property or privilege is claimed are defined as follows:

1. A liquid crystal display (LCD) system comprising an LCD cell physically and electrically coupled to a circuit board;

an IC driver mounted on the circuit board to supply drive voltages to the LCD cell;

a ROM in the IC driver for permanently storing a plurality of bit-mapped images;

means in the IC driver responsive to an image command for selecting a stored image for display on the LCD;

a serial peripheral interface in the IC driver; and a remote control circuit coupled to the IC driver via the serial peripheral interface for supplying an image command to the IC driver.

2. The invention as defined in claim 1 further including:

a display circuit responsive to the selected image for energizing pixels on the LCD cell corresponding to the bit map of the stored image.

3. The invention as defined in claim 1 wherein:

the display has a specific row and column pixel format; and the ROM has a row and column bit format for each image which directly corresponds to the display pixel format.

4. The invention as defined in claim 1 wherein the remote control circuit is a microprocessor for selecting an image for display and for serially transmitting a corresponding image command.

5. The invention as defined in claim 1 wherein the image command is a digital word corresponding to any one of the plurality of images.

6. The invention as defined in claim 1 wherein:

the image command is a digital word corresponding to any one of the plurality of images; and the means in the IC driver responsive to an image command includes a decoder responsive to the digital word and coupled to the ROM to address the location of the selected image in the ROM.

* * * * *